United States Patent
Son et al.

(10) Patent No.: US 10,181,965 B2
(45) Date of Patent: Jan. 15, 2019

(54) CHANNEL ESTIMATION METHOD AND APPARATUS IN WIRELESS COMMUNICATION SYSTEM

(71) Applicant: Samsung Electronics Co., Ltd, Gyeonggi-do (KR)

(72) Inventors: Hyuk-Min Son, Seoul (KR); Hyun-Kyu Yu, Suwon-si (KR); Jae-Won Kim, Seoul (KR); Jeong-Ho Park, Seoul (KR); Nam-Jeong Lee, Suwon-si (KR); Cheol Jeong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/323,393

(22) PCT Filed: Nov. 30, 2015

(86) PCT No.: PCT/KR2015/012908
§ 371 (c)(1),
(2) Date: Dec. 30, 2016

(87) PCT Pub. No.: WO2016/085312
PCT Pub. Date: Jun. 2, 2016

(65) Prior Publication Data
US 2017/0257230 A1 Sep. 7, 2017

(30) Foreign Application Priority Data
Nov. 28, 2014 (KR) ........................ 10-2014-0168524

(51) Int. Cl.
*H04L 25/02* (2006.01)
*H04B 7/0408* (2017.01)
*H04B 7/04* (2017.01)

(52) U.S. Cl.
CPC ............ *H04L 25/0202* (2013.01); *H04B 7/04* (2013.01); *H04B 7/0408* (2013.01); *H04L 25/0204* (2013.01); *H04L 25/0228* (2013.01)

(58) Field of Classification Search
CPC ........................... H04L 25/0202; H04B 7/0408
See application file for complete search history.

(56) References Cited

U.S. PATENT DOCUMENTS

2004/0213187 A1* 10/2004 Fujii .................... H04B 7/0408
370/335
2006/0286974 A1* 12/2006 Gore ..................... H04W 16/00
455/422.1

(Continued)

FOREIGN PATENT DOCUMENTS

KR 10-2014-0126555 A 10/2014
WO 2014-035412 A1 3/2014

OTHER PUBLICATIONS

Korean Intellectual Property Office, "International Search Report," Application No. PCT/KR2015/012908, dated Feb. 26, 2016, 5 pages, publisher KIPO, Seo-gu, Daejeon, Republic of Korea.

(Continued)

*Primary Examiner* — Mark H Rinehart
*Assistant Examiner* — Angel T Brockman

(57) ABSTRACT

The present disclosure relates to a 5G or a pre-5G communication system to be provided in order to support a higher data transmission rate than a beyond 4G communication system such as LTE. A method for estimating a channel, by a terminal, in a wireless communication system supporting beamforming using a plurality of antenna elements, which embodiments of the present disclosure provide, comprises: a step of receiving, from a base station, a set of reference beams including a plurality of reference beams; a step of selecting at least one effective beam from the plurality of reference beams included in the set of reference beams; a (Continued)

step of estimating a channel between the base station and the terminal on the basis of the selected effective beam; a step of generating channel information regarding the estimated channel; and a step of transmitting the generated channel information to the base station.

15 Claims, 11 Drawing Sheets

(56) References Cited

U.S. PATENT DOCUMENTS

| | | |
|---|---|---|
| 2010/0075705 A1 | 3/2010 | Van Rensburg et al. |
| 2010/0112952 A1* | 5/2010 | Molnar ................. H01Q 1/246 455/63.1 |
| 2013/0230081 A1 | 9/2013 | Wernersson et al. |
| 2013/0301563 A1 | 11/2013 | Gupta et al. |
| 2014/0177607 A1* | 6/2014 | Li ..................... H04W 74/0833 370/336 |
| 2014/0314167 A1 | 10/2014 | Jeong et al. |

OTHER PUBLICATIONS

Gilwon Lee, et al., "A New Approach to User Scheduling in Massive Multi-User MIMO Broadcast Channels," Submitted to IEEE Transactions on Information Theory, Mar. 27, 2014, arXiv:1403. 6931v1 [cs.IT], Mar. 2014, 45 pages.

* cited by examiner

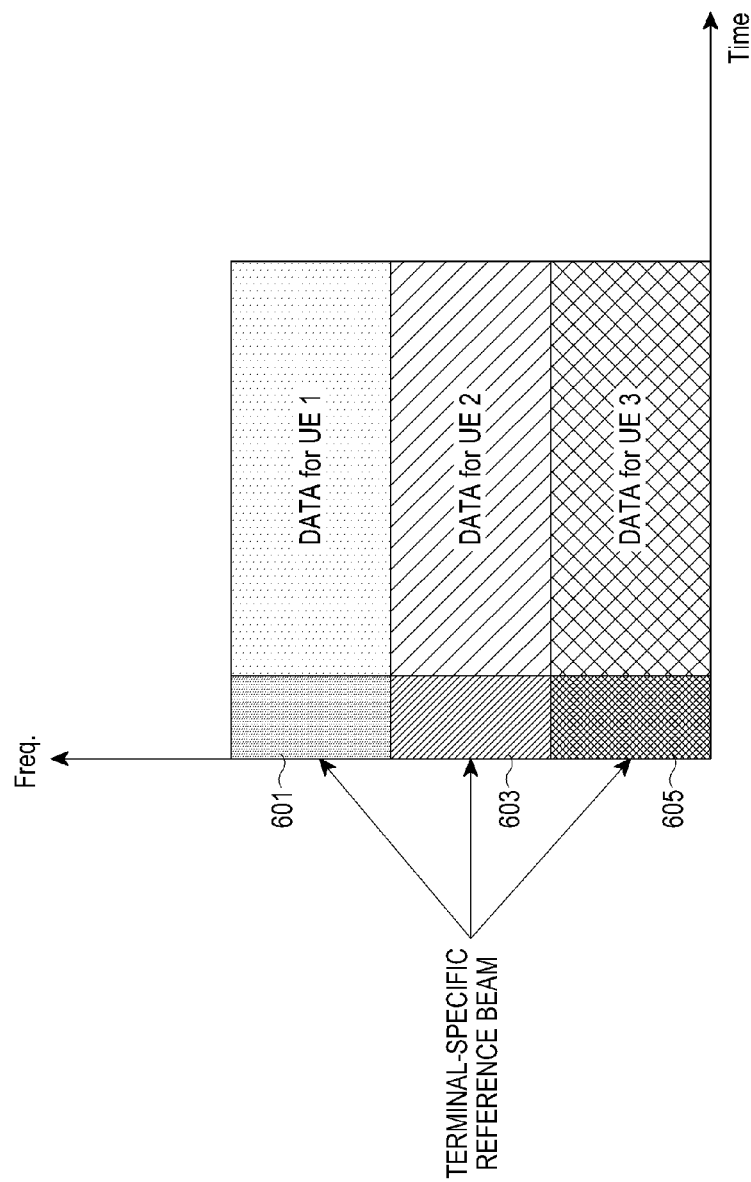

CHANNEL ESTIMATION METHOD AND APPARATUS IN WIRELESS COMMUNICATION SYSTEM

CROSS-REFERENCE TO RELATED APPLICATIONS AND CLAIM OF PRIORITY

The present application claims priority under 35 U.S.C. § 365 to International Patent Application No. PCT/KR2015/012908 filed Nov. 30, 2015, entitled "CHANNEL ESTIMATION METHOD AND APPARATUS IN WIRELESS COMMUNICATION SYSTEM", and claims priority to Korean Patent Application No. 10-2014-0168524, which was filed on Nov. 28, 2014, each of which are incorporated herein by reference into the present disclosure as if fully set forth herein.

TECHNICAL FIELD

The present disclosure relates to a method and apparatus for channel estimation in a wireless communication system supporting beamforming.

BACKGROUND ART

In order to meet wireless data traffic demands that have increased after 4th Generation (4G) communication system commercialization, efforts to develop an improved 5G communication system or a pre-5G communication system have been made. For this reason, the 5G communication system or the pre-5G communication system is called a beyond 4G network communication system or a post LTE system.

In order to achieve a high data transmission rate, an implementation of the 5G communication system in an mmWave band (for example, 60 GHz band) is being considered. In the 5G communication system, technologies such as beamforming, massive Multi-Input Multi-Output (MIMO), Full Dimensional MIMO (FD-MIMO), array antenna, analog beam-forming, and large scale antenna are discussed to mitigate a propagation path loss in the mmWave band and increase propagation transmission distance.

Further, the 5G communication system has developed technologies such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and received interference cancellation to improve the system network.

In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

In a wireless communication system supporting a millimeter wave (mm Wave) band, it can be expected that a significant increase in communication capacity by using beam forming over a wide frequency band. A multi-antenna system in the mmWave band has a small antenna space due to a high frequency band, and accordingly, through a sharp beam obtained by using a plurality of antenna elements, a high beam forming gain can be acquired.

On the other hand, in the mmWave band, a Hybrid Beam Forming (H-BF) system that uses RF chains, in which the number of RF chains is less than the number of antenna elements, and a Full Digital beam-forming (FD-BF) system that uses the RF chains, in which the number of RF chains is the same as the number of antenna elements, are being considered as next-generation communication technologies. When many RF chains are used, a performance gain can be obtained through a diversity gain or a multiplexing gain, but the problems of cost, complexity and the like can generated.

In order to perform beam forming in the above two systems in the mmWave band, channel estimation and terminal feedback are required. In a conventional Long Term Evolution (LTE) system, for a Frequency Division Duplexing (FDD) method, in order to notify of channel information to base station, a terminal generates channel information by estimating a channel between the base station and the terminal, using a reference signal transmitted from the base station, and performs feedback of the same to the base station. A Precoding Matrix Indicator (PMI) and a Channel Quality Indicator (CQI) are representative examples of the feedback information. The PMI is information used by the base station to generate a precoding matrix and the CQI is information used by the base station to perform scheduling, and Modulation, and Coding Scheme (MCS) selection.

However, since a high path loss occurs in the mmWave band, it is difficult to use a channel estimation method using a reference signal, used in the conventional LTE, due to limitation in the coverage of the reference signal.

DETAILED DESCRIPTION OF THE DISCLOSURE

Technical Problem

According to the hybrid beam forming method in the conventional mm Wave band, a base station sequentially transmits a plurality of beams in an angular domain with respect to a predetermined interval or sector, using frequency or time resources. A terminal performs discovery for a Best beam Index (BI) based on the reception strength of the received beam, calculates CQI for the corresponding beam, and feeds back the CQI information to the base station. Then, the base station performs scheduling on terminals to which service is provided, and transmits a reference signal through the best beam fed back by the corresponding terminals, so as to perform channel estimation for each effective channel, i.e., for each RF chain of a transmitter/receiver.

According to the method, it is not possible to estimate an actual channel for each antenna between a base station transmitter and a terminal receiver. That is, the channel information estimated by the terminal is not accurate when compared with channel information on the actual channel. Therefore, when the base station performs scheduling for the terminal and performs beamforming based on the channel information, the performance of the same becomes poor.

An embodiment of the present disclosure provides a method and apparatus for performing channel estimation by a base station or a terminal in a wireless communication system supporting beamforming.

An embodiment of the present disclosure provides a method and apparatus for transmitting a reference beam by a base station in a wireless communication system supporting beamforming.

An embodiment of the present disclosure provides a method and apparatus for generating a cell-specific reference beam or a terminal-specific reference beam and transmitting the same by a base station in a wireless communication system supporting beamforming.

An embodiment of the present disclosure provides a method and apparatus for selecting an effective beam among received reference beams, and performing channel estimation using the same or generating a feedback signal, by a terminal, in a wireless communication system supporting beamforming.

An embodiment of the present disclosure provides a method and apparatus for triggering a feedback mode by a base station or a terminal, and accordingly generating a feedback signal from reference beams transmitted by the base station and transmitting the same, by a terminal, in a wireless communication system supporting beamforming.

An embodiment of the present disclosure provides a method and apparatus for reducing overhead when a terminal transmits a feedback signal in a wireless communication system supporting beamforming.

Technical Solution

According to an embodiment of the present disclosure, a method for estimating a channel by a terminal in a wireless communication system supporting beamforming using a plurality of antenna elements is provided. The method includes: receiving, from a base station, a set of reference beams including a plurality of reference beams; selecting at least one effective beam from the plurality of reference beams included in the set of reference beams; estimating a channel between the base station and the terminal on the basis of the selected effective beam; generating channel information regarding the estimated channel; and transmitting the generated channel information to the base station.

According to an embodiment of the present disclosure, a method for receiving channel information by a base station in a wireless communication system supporting beamforming using a plurality of antenna elements is provided. The method includes: transmitting a set of reference beams including the plurality of reference beams to a terminal; and receiving, from the terminal, channel information on a channel between the base station and the terminal, estimated by the terminal, on the basis of at least one effective beam selected from a plurality of reference beams included in the set of reference beams.

According to an embodiment of the present disclosure, a terminal apparatus for estimating a channel in a wireless communication system supporting beamforming using a plurality of antenna elements is provided. The terminal apparatus includes: a controller configured to receive, from a base station, a set of reference beams including a plurality of reference beams, and select at least one effective beam from the plurality of reference beams included in the set of reference beams; a channel estimator configured to estimate a channel between the base station and the terminal on the basis of the selected effective beam, and generate channel information regarding the estimated channel; and a transceiver configured to transmit the generated channel information to the base station. According to an embodiment of the present disclosure, a base station apparatus for estimating a channel in a wireless communication system supporting beamforming using a plurality of antenna elements is provided. The base station apparatus includes: a beam generator configured to transmit a set of reference beams including the plurality of reference beams to a terminal; and a controller configured to receive, from the terminal, information on channel between the base station and the terminal, estimated by the terminal, on the basis of at least one effective beam selected from a plurality of reference beams included in the set of reference beams.

According to an embodiment of the present disclosure, a method for transmitting a feedback signal by a terminal in a wireless communication system supporting beamforming using a plurality of antenna elements is provided. The method includes: receiving, from a base station, a set of reference beams including a plurality of reference beams; selecting at least one effective beam from the plurality of reference beams included in the set of reference beams; and transmitting information on the selected effective beam to the base station.

According to an embodiment of the present disclosure, a method for estimating a channel by a terminal in a wireless communication system supporting beamforming using a plurality of antenna elements is provided. The method includes: transmitting a set of reference beams including the plurality of reference beams to a terminal; receiving, from the terminal, effective beam information on at least one effective beam selected from a plurality of reference beams included in the set of reference beams; and estimating a channel between the base station and the terminal on the basis of the received effective beam information.

According to an embodiment of the present disclosure, a terminal apparatus for transmitting a feedback signal in a wireless communication system supporting beamforming using a plurality of antenna elements is provided. The terminal apparatus includes: a controller configured to receive, from a base station, a set of reference beams including the plurality of reference beams, and to select at least one effective beam from the plurality of reference beams included in the set of reference beams; and a transceiver configured to transmit information on the selected effective beam to the base station.

According to an embodiment of the present disclosure, a base station apparatus for estimating a channel in a wireless communication system supporting beamforming using a plurality of antenna elements is provided. The base station apparatus includes: a beam generator configured to transmit a set of reference beams including the plurality of reference beams to a terminal; and a controller configured to receive, from the terminal, effective beam information on at least one effective beam selected from a plurality of reference beams included in the set of reference beams, and estimate a channel between the base station and the terminal on the basis of the received effective beam information.

BRIEF DESCRIPTION OF THE DRAWINGS

FIG. 6 is a diagram illustrating an example of a resource area to which a terminal-specific reference beam is transmitted according to an embodiment of the present disclosure;

MODE FOR CARRYING OUT THE DISCLOSURE

Figure 1:
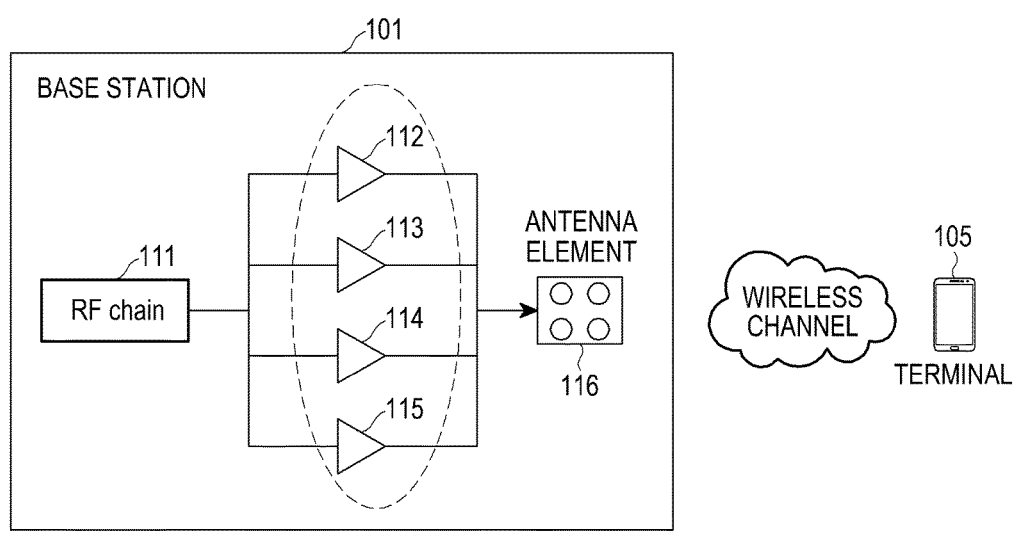
FIG. 1 is a diagram illustrating a channel estimation method according to an embodiment of the present disclosure.

In the following description of the present disclosure, a detailed description of known configurations or functions incorporated herein will be omitted when it is determined that the detailed description may make the subject matter of the present disclosure unclear. Hereinafter, embodiments of the present disclosure will be described in detail with reference to the accompanying drawings.

Although embodiments of the present disclosure described below will be divided for the convenience of description, two or more embodiments may be combined within the range where the embodiments do not collide each other.

The terms as described below are defined in consideration of the functions of the present disclosure, but the meaning of the terms may be changed according to a user, intention of an operator, or convention. Therefore, the definitions of the terms should be made based on the contents throughout the specification.

The present disclosure may have various modifications and various embodiments, among which specific embodiments will now be described more fully with reference to the accompanying drawings. However, it should be understood that there is no intent to limit the present disclosure to the particular forms disclosed, but on the contrary, the present disclosure is to cover all modifications, equivalents, and alternatives falling within the spirit and scope of the disclosure.

Although the terms including an ordinal number such as first, second, etc. can be used for describing various elements, the structural elements are not restricted by the terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more associated items.

The terms used herein are used only to describe particular embodiments, and are not intended to limit the present disclosure. As used herein, the singular forms are intended to include the plural forms as well, unless the context clearly indicates otherwise. In the present disclosure, the terms such as "include" and/or "have" may be construed to denote a certain characteristic, number, step, operation, constituent element, component or a combination thereof, but may not be construed to exclude the existence or a possibility of the addition of one or more other characteristics, numbers, steps, operations, constituent elements, components or combinations thereof.

Unless defined otherwise, all terms used herein, including technical and scientific terms, have the same meaning as those commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present specification.

Hereinafter, various embodiments will be described with reference to the accompanying drawings. It should be noted that the same elements will be designated by the same reference numerals although they are shown in different drawings. Further, in the following description of the present disclosure, a detailed description of known functions and configurations incorporated herein will be omitted when it may make the subject matter of the present disclosure rather unclear. In the following description, it is noted that only structural elements necessary for understanding operations according to various embodiments will be described, and the description of the other elements will be omitted in order to prevent obscuring of the subject matter of the present disclosure.

An apparatus and a method provided by an embodiment of the present disclosure can be applied to various communication systems, such as a Long Term Evolution (LTE) mobile communication system, a LTE-Advanced (LTE-A) mobile communication system, a High Speed Downlink Packet Access (HSDPA) mobile communication system, a High Speed Uplink Packet Access (HSUPA) mobile communication system, a High Rate Packet Data (HRPD) mobile communication system of 3rd Generation Project Partnership 2 (3GPP2), a Wideband Code Division Multiple Access (WCDMA) mobile communication system 3GPP2, a Code Division Multiple Access (CDMA) mobile communication system of 3GPP2, Institute of an Electrical and Electronics Engineer (EEEE) 802.16m communication system, an Evolved Packet System (EPS), a Mobile Internet Protocol (Mobile IP) system and the like.

Prior to the description of the embodiments of the present disclosure, a brief description will be given for the main concept of the present disclosure.

The present disclosure proposes a scheme for performing channel estimation in a wireless communication system using a beamforming method. In the channel estimation method proposed by the present disclosure, a base station transmits a plurality of reference beams, and a terminal selects, among reference beams, effective beams for which the reception signal value is equal to or greater than a predetermined reference value, and performs channel estimation using the effective beams. The detailed schemes are as follows.

First, the base station transmits a plurality of reference beams. The present disclosure does not place any particular limitation on a scheme in which a base station configures a plurality of reference beams. Therefore, the reference beams may be orthogonal or not be orthogonal to each other. That is, the set of reference beams transmitted by the base station may include "orthogonal beams", or may include "non-orthogonal beams".

A channel estimation method in a case where the reference beams are configured by orthogonal beams is as follows. The terminal measures the reception signal strength for a plurality of reference beams, and selects reference beams for which signal strength is equal to or greater than a reference value. The reference beams, selected using the method, are referred to as "effective beams". Then, the terminal estimates a channel between the terminal and the base station using the selected effective beams. Then, the terminal may perform an operation, such as generating a feedback signal, using the estimated channel.

A channel estimation method in a case where the reference beams are configured by non-orthogonal beams is as follows. The terminal measures the reception signal strength for a plurality of reference beams and performs orthogonalization of the reception signal strength values of the measured reference beams, respectively. Then, the terminal selects, as effective beams, the reference beams for which the value of the orthogonalized reception signal strength is equal to or greater than a predetermined reference value, and performs orthogonalization of the selected effective beams. Then, the terminal estimates a channel between the terminal and the base station using the orthogonalized effective beams. Then, the terminal may perform an operation, such as generating a feedback signal, using the estimated channel.

The channel estimation method described above according to the present disclosure will be described in more detail with reference to FIG. 1.

On the other hand, the channel estimation of the present disclosure may be performed by the base station or the terminal, and an embodiment in which the terminal performs channel estimation will be described in FIG. 2, and an embodiment in which the base station performs channel estimation will be described in FIG. 3.

In addition, in the present disclosure, the base station transmits a reference beam, and the type of the reference beam can be divided into a cell-specific reference beam and a terminal-specific reference beam. The cell-specific reference beam is a reference beam commonly transmitted to all cells located within the cell coverage of the corresponding base station, and the terminal-specific reference beam is a reference beam transmitted only to an arbitrary terminal. The operation method of the cell-specific reference beam will be described with reference to FIG. 4A and FIG. 4B, and FIG. 5A and FIG. 5B, and the operation method of the terminal-specific reference beam will be described with reference to FIG. 6.

Meanwhile, a case where the terminal transmits a feedback signal according to the channel estimation method of the present disclosure and a case where the terminal transmits the feedback signal according to the conventional method may be selectively applied according to the state of the terminal or the network state. Accordingly, the present disclosure proposes a method for selecting a feedback mode of a terminal and performing a feedback operation according thereto. This will be described in FIG. 7, and FIG. 8A and FIG. 8B.

Further, in the present disclosure, when the terminal transmits the feedback signal according to the present disclosure, a scheme for compressing the feedback signal and transmitting/receiving the same in order to reduce the overhead is proposed. This will be described with reference to FIG. 9, and FIG. 10A and FIG. 10B.

Embodiments of the present disclosure will be described in detail according to the basic concept of the present disclosure described above.

Hereinafter, a channel estimation method according to an embodiment of the present disclosure will be described.

In the present disclosure, a base station may transmit a plurality of predetermined reference beams to a terminal, and the terminal may estimate a channel between the base station and the terminal using information on the received beam. The reference beam may be a cell-specific reference beam or a terminal-specific reference beam. The information on the received beam may include information on the reception signal value (complex value) of a corresponding beam and information on a weight value of the corresponding reference beam. For reference, the reception signal value of the corresponding beam is an analog complex value.

FIG. 1 is a diagram illustrating a channel estimation method according to an embodiment of the present disclosure.

It is assumed that a terminal (MS) 105 has one antenna, and one RF chain 111 in a base station (BS) 101 includes four antennas 112, 113, 114 and 115. At this time, the size of a channel h vector for each antenna element 116 between the BS 101 and the MS 105 is 1×4 (=number of reception antennas×number of transmission antennas).

First, a method for estimating a channel using an orthogonal reference beam will be described.

When the BS 101 transmits four orthogonal reference beams w1, w2, w3 and w4, each of the reception signal values of the reference beams are described as a1=h*w1, a2=h*w2, a3=h*w3, and a4=h*w4. For reference, each of the four orthogonal reference beams w1, w2, w3, and w4 may be given as a 4×1 normalized vector, and the reception signal value may be described as a complex value on the assumption that there is no noise for the convenience of description. In the above-described example, the channel between the BS 101 and the MS 105 is described by Equation 1 as follows.

$$h = a_1 w_1^H + a_2 w_2^H + a_3 w_3^H + a_4 w_4^H \quad \text{[Equation 1]}$$

Here, H denotes a conjugate for the signal value a, and denotes a conjugate transpose for each reference beam vector w.

In the present disclosure, each of the reception signal value for the four reference beams is compared with a predetermined reference value, and when the reception signal value is less than the reference value, a reception signal component corresponding to the corresponding reference beam is excluded and then channel estimation is performed according to the Equation 1. For example, when each of the reception signal values of the reference beams w1 and w3 is equal to or greater than a predetermined reference value, and each of the reception signal values of the reference beams w2 and w4 is less than the reference value, the channel estimation between the terminal and the base station is performed while excluding the w2 and w4. The channel estimation according thereto is represented by equation 2 as follows.

$$h = a_1 w_1^H + a_3 w_3^H \quad \text{[Equation 2]}$$

The reception signal value of the reference beam, which is in a direction similar to an actual channel direction between the base station and the terminal among the reference beams transmitted by the BS 101, has a greater value than the reception signal value of the reference beam in a direction not similar thereto. Therefore, in the present disclosure, only reference beams for which the reception signal values are equal to or greater than a predetermined reference value are selected as "effective beam" in order to select reference beams in a direction similar to the channel between the actual base station and the terminal among the predetermined reference beams, and linear combination is performed on the reception signal values of the selected effective beams, so as to estimate a channel between the terminal and the base station.

A method for estimating a channel using non-orthogonal reference beams is as follows.

When the BS 101 transmits non-orthogonal beams, the present disclosure may perform orthogonalization of the non-orthogonal reference beams so as to estimate the channel. For example, when the reception signal strengths of the reference beams w1 and w3, among the four reference beams, are equal to or greater than a reference value but the two reference beams are not orthogonal to each other, the channel estimation according to Equation 2 is not possible. This is because non-orthogonal beams may not be used as bases, and even if linear combination is performed thereon, original channel estimation may not be performed.

Accordingly, in the present disclosure, when a terminal receives non-orthogonal reference beams, the terminal performs orthogonalization of the reception signal value of each of the received non-orthogonal reference beams and selects an effective beam based on the orthogonalized value. The orthogonalization process proposed in the present disclosure may be performed by Equation 3 as follows.

A process of orthogonalizing the non-orthogonal reference beam so as to select an effective reference beam will be described as follows.

The terminal selects the reference beam for which the reception signal value is the greatest, among the reception signal values of the received non-orthogonal reference signal, and orthogonalizes the remaining reference beams based on the selected reference beam. Then, the magnitude of the reception signal of each of the orthogonalized remaining reference beams are calculated again in the orthogonal direction.

The beam which has the greatest reception signal value is selected among the re-calculated values for the remaining reference beams, and the above process is repeated. In the process, when the reception signal value of the beam is equal to or greater than a certain reference value, the beam is selected as an effective beam. The selected orthogonal effective beams and the reception signal values corresponding to the orthogonalized beams are linearly combined to estimate the channel of the MS. The above-described process may be described, for example, based on four non-orthogonal reference beams w1, w2, w3 and w4, and be represented by Equation 3 as follows.

$$b_1 = w_1$$

$$b_2 = (w_2 - b_1^H w_2 b_1)/\|(w_2 - b_1^H w_2 b_1)\|$$

$$b_3 = (w_3 - b_1^H w_3 b_1)/\|(w_3 - b_1^H w_3 b_1)\|$$

$$b_4 = (w_3 - b_1^H w_3 b_1)/\|(w_3 - b_1^H w_3 b_1)\|$$

$$g_1 = a_1$$

$$g_2 = (a_2 - a_1 b_1^H w_2)/\|(w_2 - b_1^H w_2 b_1)\|$$

$$g_3 = (a_3 - a_1 b_1^H w_3)/\|(w_3 - b_1^H w_3 b_1)\|$$

$$g_4 = (a_4 - a_1 b_1^H w_4)/\|(w_4 - b_1^H w_4 b_1)\|$$

$$h \approx g_1 b_1^H + g_3 b_3^H \qquad \text{[Equation 3]}$$

Equation 3 will be described as follows.

First, when w1 of the four reference beams has the greatest reception signal value and the corresponding signal value is equal to or greater than a certain reference value, the w1 and the corresponding reception signal value are selected as an effective beam and an effective reception signal value.

Then, the remaining beams (w2, w3, w4) are orthoginalized into b2 to b4 on the basis of w1, and the signal value corresponding to the corresponding beam is calculated again. In Equation 3, values of g2 to g4 correspond to the re-calculated signal values. When g3 is the greatest value among g2, g3, and g4, and the g3 is equal to or greater than a predetermined reference value, b3 is selected as an effective beam, and g3 is selected as a reception signal value of b3 and used for channel estimation. In this manner, a process where the remaining beams are re-orthogonalized based on the b3 beam in the same manner as the method described in Equation 3 and a process where the effective beam is selected are repeated. However, Equation 3 is only an example of a method for performing orthogonalization of a beam, and other orthogonalization methods other than Equation 3 may also be used.

In the case where the orthogonal reference beams and the non-orthogonal reference beams are used, respective channel estimation methods have been described so far. The channel estimation method of the non-orthogonal reference beams is the same as the channel estimation method of orthogonal reference beams except that an orthogonalization process is additionally required in the channel estimation method of the orthogonal reference beam.

The process of channel estimation according to the present disclosure will be summarized as follows. That is, in the case of the orthogonal reference beams, the channel estimation of the terminal is performed by using beams only for which the reception signal strengths are equal to or greater than a reference value excluding reference beams for which the reception signal strength, among reference beams transmitted by the base station, is less than a reference value. As described above, the channel estimated excluding the reference beam for which the reception signal strength is less than the reference value is referred to as a "sparse channel". For non-orthogonal reference beams, a process of performing orthogonalization of the reception signal values of non-orthogonal reference beams is added to the channel estimation method of orthogonal reference beams.

So far it has been assumed that the subject of channel estimation according to the present disclosure is the MS. However, in the present disclosure, the subject of channel estimation does not necessarily need to be an MS, and the base station may be the subject of channel estimation. Hereinafter, FIG. 2 and FIG. 3 describe a channel estimation method according to the subject of channel estimation.

Figure 2:
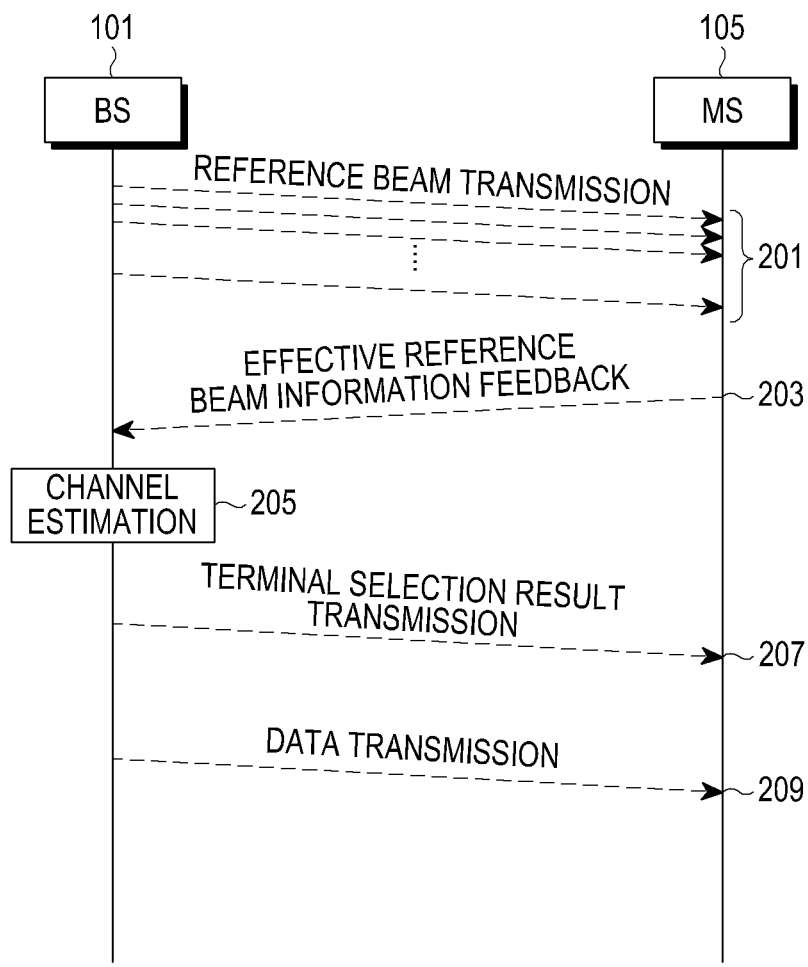
FIG. 2 is a diagram illustrating a process of performing channel estimation by a base station as a subject.

FIG. 2 is a diagram illustrating a process of performing channel estimation by a base station as a subject according to the present disclosure.

In step 201, the base station (BS) 101 transmits reference beams to the terminal (MS) 105. In step 203, the MS 105 measures reception signal strengths of the received reference beams, selects, as effective beams, reference beams for which the reception signal strengths are equal to or greater than a predetermined reference value, and generates information on the selected effective beams so as to feedback the same to the BS 101.

Here, information on the effective beam includes the signal strength value on the effective beam and beam index information. In addition, the signal value may be transmitted as a quantized value. Meanwhile, as a method for performing feedback of the beam index value, an explicit method and an implicit method are possible. The explicit method is a method for performing direct feedback of the beam index value, and the implicit method is a method for performing feedback in the form of beam index information associated with at least one of frequency and time resources or the ID of the MS 105.

In step 205, the base station (BS) 101 estimates a channel of the MS 105 using information on the received effective beam. For reference, the BS 101 may perform scheduling for the MS 105 using the channel estimation, and may design a Pre-coder of a baseband and high-frequency band.

In step 207, the BS 101 may select the MS 105 based on the channel estimation, and notify of a result of the selection to the MS 105, and transmit data to the MS 105 in step 209.

Figure 3:
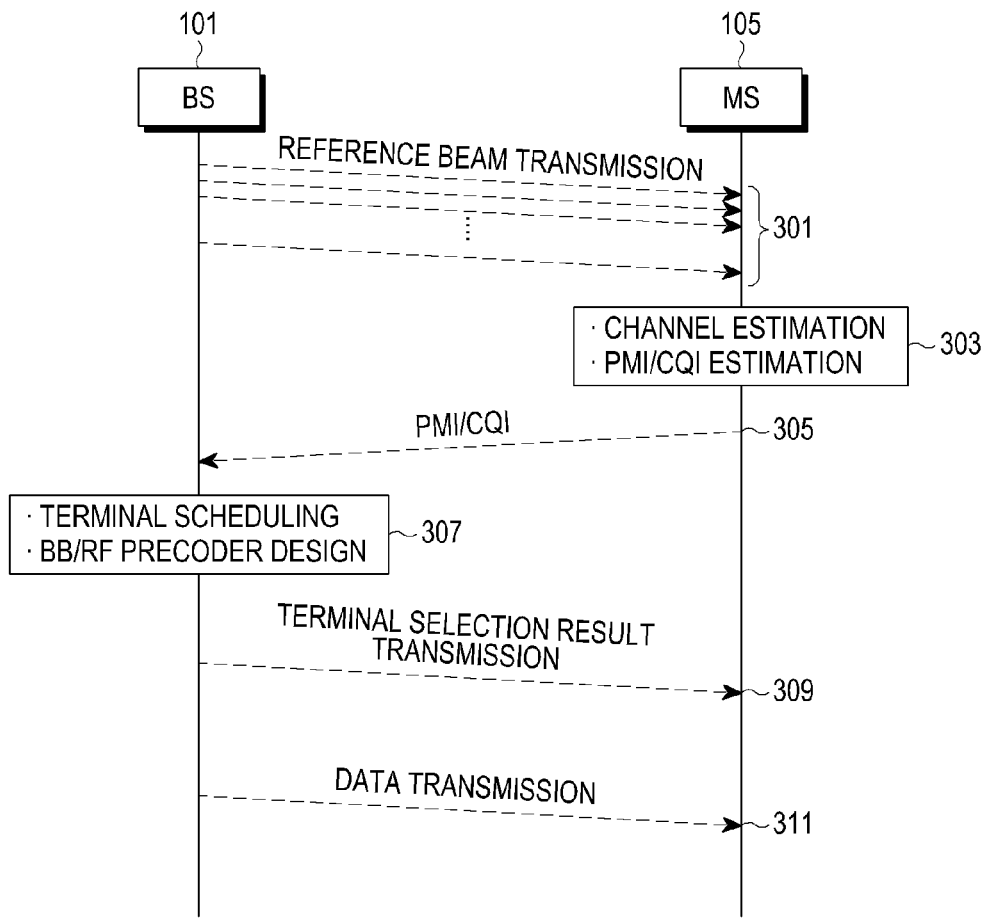
FIG. 3 is a diagram illustrating a process of performing channel estimation by a terminal according to the present disclosure.

FIG. 3 is a diagram illustrating a process of performing channel estimation by a terminal according to the present disclosure.

In step 301, the base station (BS) 101 transmits reference beams to the terminal (MS) 105.

In step 303, the MS 105 measures the reception signal strengths of the received reference beams, selects reference beams for which the reception signal strengths are equal to or greater than a predetermined reference value as effective beams, and configures a sparse channel, using the selected effective beams so as to estimate the channel. In addition, the MS 105 generates a feedback signal to be transmitted to the base station based on the selected effective beam or the estimated channel. The feedback signal may be, for example, a Pre-coder Matrix Indication (PMI) or a Channel Quality Indicator (CQI) used in a Long Term Evolution (LTE) system.

In step 305, the MS 105 transmits the feedback signal to the BS 101. In step 307, the BS 101 may perform scheduling for the MS 105 using the feedback signal, and may design a pre-coder of a baseband and high-frequency band. Then, in step 309, the BS 101 may notify of a result of selection to the MS 105, and transmit data to the MS 105 in step 311.

Hereinafter, as a reference beam which is generated by the base station and is transmitted to the MS, the cell-specific reference beam and the MS-specific reference beam proposed in the present disclosure will be described.

The cell-specific reference beam is a reference beam that is commonly transmitted to all terminals located within the cell coverage of the corresponding base station, and terminals within the cell coverage may perform channel estimation using cell-specific reference beams, according to the present disclosure.

Meanwhile, the terminal-specific reference beam is a reference beam transmitted only to a specific terminal and, when current channel information on the corresponding terminal or information equivalent thereto exists in advance, is a reference beam generated with respect to the corresponding terminal based on the current channel information or information equivalent thereto, and may be used to acquire more accurate channel information than the current channel information. For reference, the current channel information may be channel information estimated by the base station or the terminal, and the information equivalent to the channel information may be effective beam information which is fed back to the base station by the terminal in step 203 in FIG. 2. The operation method of the cell-specific reference beam will be described hereinafter.

In the following, in relation to the cell-specific reference beam, a resource area where the cell-specific reference beam is transmitted and a design method of the cell-specific reference beams will be described.

Figure 4A:
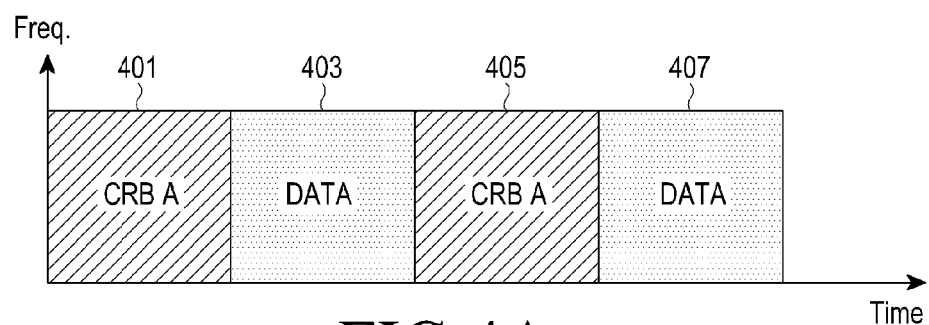
FIG. 4A and FIG. 4B are drawings illustrating examples in which cell-specific reference beams are transmitted in a time-frequency resource area according to an embodiment of the present disclosure.
Figure 4B:
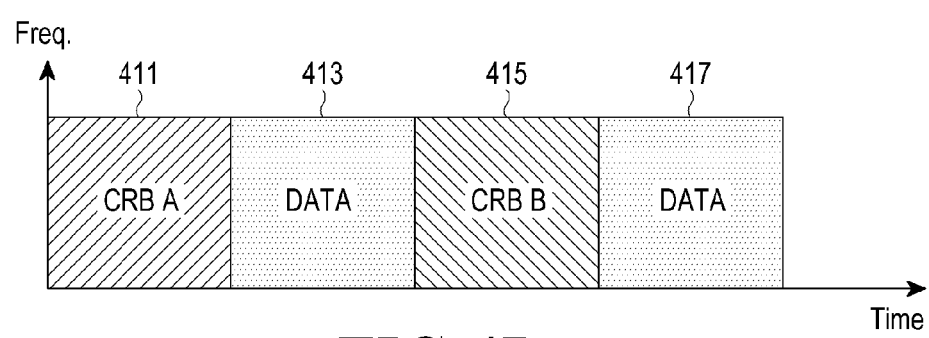

FIG. 4A and FIG. 4B are drawings illustrating an example in which cell-specific reference beams are transmitted in a time-frequency resource area according to an embodiment of the present disclosure.

FIG. 4A illustrates that one set of cell-specific reference beams is temporally repeatedly transmitted through a predetermined time-frequency resource block, and FIG. 4B illustrates that two sets of cell-specific reference beams are temporally repeatedly transmitted through the time-frequency resource block. The repeated transmission time in FIG. 4A and FIG. 4B may be periodical or non-periodical.

Referring to FIG. 4A and FIG. 4B, reference numbers 401, 405, 411, and 415 denote resource blocks (Cell-specific Resource Blocks: CRB) to which cell specific reference beams are transmitted, and the remaining reference numbers denote resource blocks to which data is transmitted. In FIG. 4A, reference numbers 401 and 405 are denoted as CRB A. This indicates that the same cell-specific reference beam set A in the resource blocks of reference numerals 401 and 405 is repeatedly transmitted through the corresponding resource blocks. On the other hand, in FIG. 4B, reference number 411 is described as CRB A, and reference numeral 415 is described as CRB B. This indicates that the cell-specific reference beam sets A and B are alternately transmitted.

Meanwhile, the cell-specific reference block set A and set B may be a set configured by orthogonal reference beams or a set configured by non-orthogonal reference beams, respectively. That is, the set A may be configured by orthogonal reference beams or may be configured by non-orthogonal reference beams. Similarly, the set B may be configured by orthogonal reference beams or may be configured by non-orthogonal reference beams.

Figures 5A, 5B:
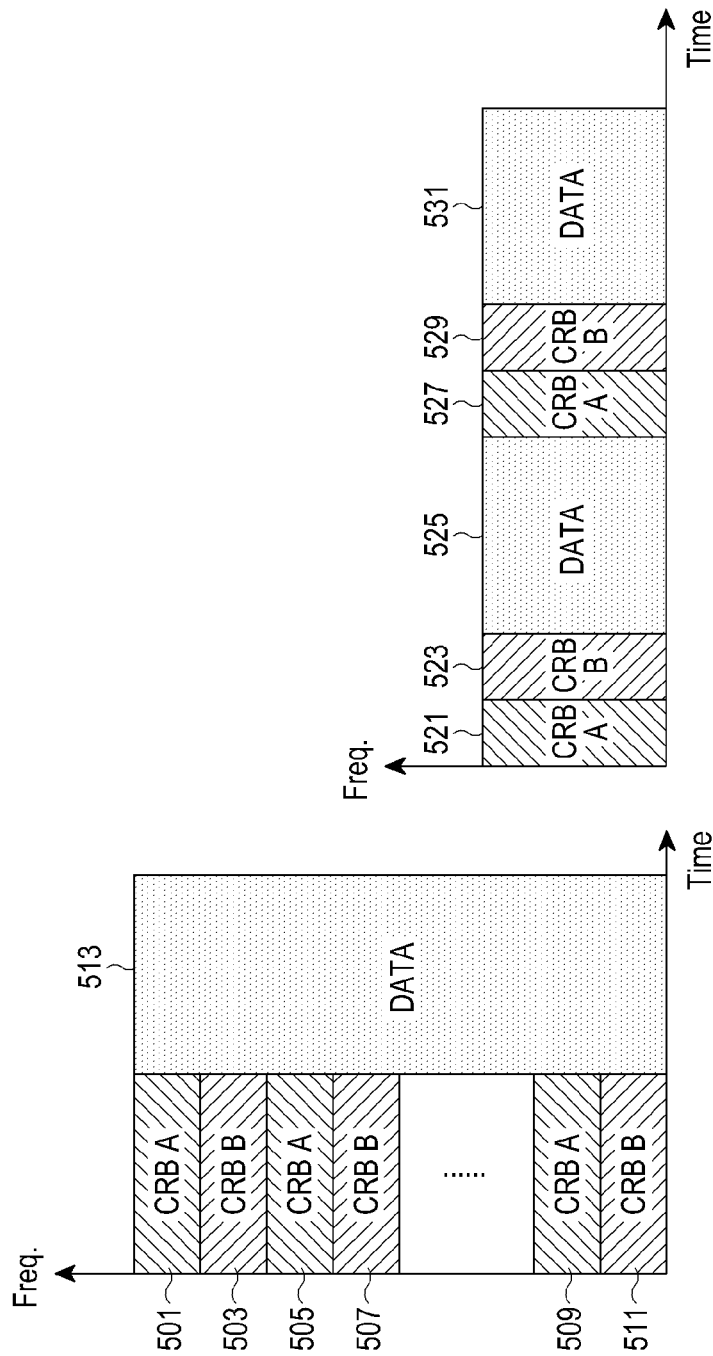
FIG. 5A and FIG. 5B are drawings illustrating another example in which cell-specific reference beams are transmitted in a time-frequency resource area according to an embodiment of the present disclosure.

FIG. 5A and FIG. 5B are drawings illustrating another example in which cell-specific reference beams are transmitted in a time-frequency resource area according to an embodiment of the present disclosure.

In FIG. 5A illustrates that the successive transmission of two sets of cell-specific reference beams are performed on the frequency domain through a time-frequency resource block, and FIG. 5B illustrates that the temporally successive transmission of two sets of cell-specific reference beams are repeated through the time-frequency resource block.

Referring to FIG. 5A, it can be seen that CRB A is transmitted in reference numerals 501, 505, and 509, and CRB B is transmitted in reference numerals 503, 507, and 511. That is, it can be seen that two cell-specific reference beam sets A and B are successively arranged on the frequency domain, and the arrangement of A and B is repeated on a frequency resource.

Referring to FIG. 5B, CRB A is assigned to reference numeral 521, and CRB B is assigned to reference numeral 523, so that the reference beam sets A and B are successively transmitted. It can also be seen that the reference beam sets A and B are re-transmitted in reference numerals 527 and 529.

Meanwhile, as described in FIG. 4A and FIG. 4B, the cell-specific reference block set A and set B may be a set configured by orthogonal reference beams or a set configured by non-orthogonal reference beams, respectively. That is, the set A may be configured by orthogonal reference beams or may be configured by non-orthogonal reference beams. Similarly, the set B may be configured by orthogonal reference beams or may be configured by non-orthogonal reference beams.

As described in FIG. 4A and FIG. 4B, and FIG. 5A and FIG. 5B, a combination of various cell-specific reference beam sets may be transmitted in combination of various methods on a time-frequency resource area. In other words, it can be operated as only one reference beam set or with a plurality of reference beam sets. Meanwhile, the non-orthogonal reference beam set may be typically configured based on the Line Of Sight (LOS) in an angular domain, and the orthogonal reference beam set is typically configured based on a spatial domain.

Hereinafter, in relation to the terminal-specific reference beams, a design method thereof and an operation method thereof will be described based on a exists in advance, the reference beam generated with respect to the corresponding terminal based on the current channel information or information equivalent thereto, and may be used to acquire more accurate channel information than the current channel information.

The current channel information may be channel information (e.g., PMI or CQI) based on a reference signal of a conventional LTE communication system or may be channel information (e.g., PMI or CQI) based on a reference beam according to the present disclosure described in FIG. 3. When the channel information is thus known to the base station, the base station may generate a terminal-specific reference signal for the corresponding terminal based on the channel information, and transmit the same to the corresponding terminal. The corresponding terminal may generate more accurate channel information using the terminal-specific reference beam.

Meanwhile, the information equivalent to the current channel information may be the effective beam information which is fed back to the base station by the terminal in step 203 of FIG. 2 previously described. That is, as described above, the base station transmits the cell-specific reference beam to the terminal, and feeds back the selected effective beam information to the base station, using the cell-specific reference beam according to FIG. 2. The base station may generate a terminal-specific reference beam for only the corresponding terminal, using the effective beam information, and transmit the same to the corresponding terminal. The corresponding terminal may generate more accurate channel information than channel information based on the cell-specific reference beam, using the terminal-specific reference beam.

Meanwhile, in the present disclosure, the terminal-specific reference beams may be operated by terminal triggering or base station triggering.

For the terminal triggering method, the terminal may request for the terminal-specific reference beams to the base station, and in response thereto, the base station may generate the terminal-specific reference beam based on the current channel information or the effective beam information on the corresponding terminal, and transmit the same to the corresponding terminal.

For the base station triggering method, under the base station's own judgment without the request by the terminal, the base station may generate the terminal-specific reference beam based on the current channel information or the effective beam information on the corresponding terminal, and transmit the same to the corresponding terminal.

Meanwhile, as a detail method of designing the terminal-specific reference beam using the current channel information or the effective beam information, typically two types of methods are possible.

First, the terminal-specific reference beams may be generated in a space orthogonal to the channel space according to the current channel information or in a space orthogonal to the channel space according to the effective beams. Second, the terminal-specific reference beams may be generated in a space adjacent to the channel space according to the current channel information or in a space adjacent to the channel space according to the effective beams.

For reference, the terminal-specific reference beam may be generated using the effective beam as described above, but it is also possible, as another method, to directly utilize a transmission beam for transmitting data rather than the effective beam selected by the terminal.

Meanwhile, resources to which the terminal-specific reference beams are transmitted may be arranged in various methods within a resource area allocated to the corresponding terminal. FIG. 6 is a diagram illustrating an example of a resource area to which a terminal-specific reference beam is transmitted according to an embodiment of the present disclosure.

Referring to FIG. 6, reference numerals 601, 603, and 605 denote reference beams for UE1, UE2, and UE3, respectively. It can be seen that each of terminal-specific reference beams is arranged in the front portion of a resource area for each UE. However, this is only one example in which reference beams are arranged, and locations in which the reference beams are arranged may be variously modified as previously described.

The operation method of the cell-specific reference beam and the terminal-specific reference beam has been described so far. In the present disclosure, the cell-specific reference beam and the terminal-specific reference beam may be operated independently, or may be operated together as previously described.

Hereinafter, a scheme for operating the feedback method proposed by the present disclosure together with the conventional feedback method according to the state of the terminal or the network state will be described.

In the above FIG. 2 and FIG. 3, a method has been described, in which the base station transmits a reference beam and the terminal selects an effective beam from the reference beams and feeds back the selected effective beam information, or selects an effective beam from the reference beam and directly estimates a channel therefrom to generate PMI/CQI information and feedback the same. The feedback method is referred to as a "reference beam-based feedback method". The reference beam-based feedback method may be operated together with the "conventional feedback method".

The conventional feedback method is as follows. The base station successively transmits fixed analog beams, and the terminal selects the best beam among the received analog beams, and feeds back the selected index and the CQI of the corresponding beam. Thereafter, the base station performs terminal scheduling using the CQI, and then transmits data to each terminal through the selected analog beam. Performance according to the conventional feedback method is lower than the performance of the case of performing channel estimation, scheduling and beamforming using the "reference beam-based feedback" method according to the present disclosure. However, it has an advantage in that the system design for the conventional feedback method may be simpler than the reference beam-based feedback method according to the present disclosure.

Therefore, in the present disclosure, the conventional feedback method and the reference beam-based feedback method according to the present disclosure can be operated in a mixed mode. For example, when the terminal desires a relatively low data rate or a low quality of service (QoS), services may be performed according to the conventional feedback method. On the other hand, when the terminal desires a high data rate or high QoS, the channel estimation, scheduling and beamforming may be performed according to the reference beam-based feedback method of the present disclosure.

However, in order to select the feedback method and perform the operation according thereto, the base station or the terminal determines a feedback method, and signaling is required to trigger the determined feedback method. Hereinafter, an operation of selecting the conventional feedback method or the reference beam feedback method according to the present disclosure, and an operation according to the selected method will be described with reference to FIG. 7, and FIG. 8A and FIG. 8B.

Figure 7:
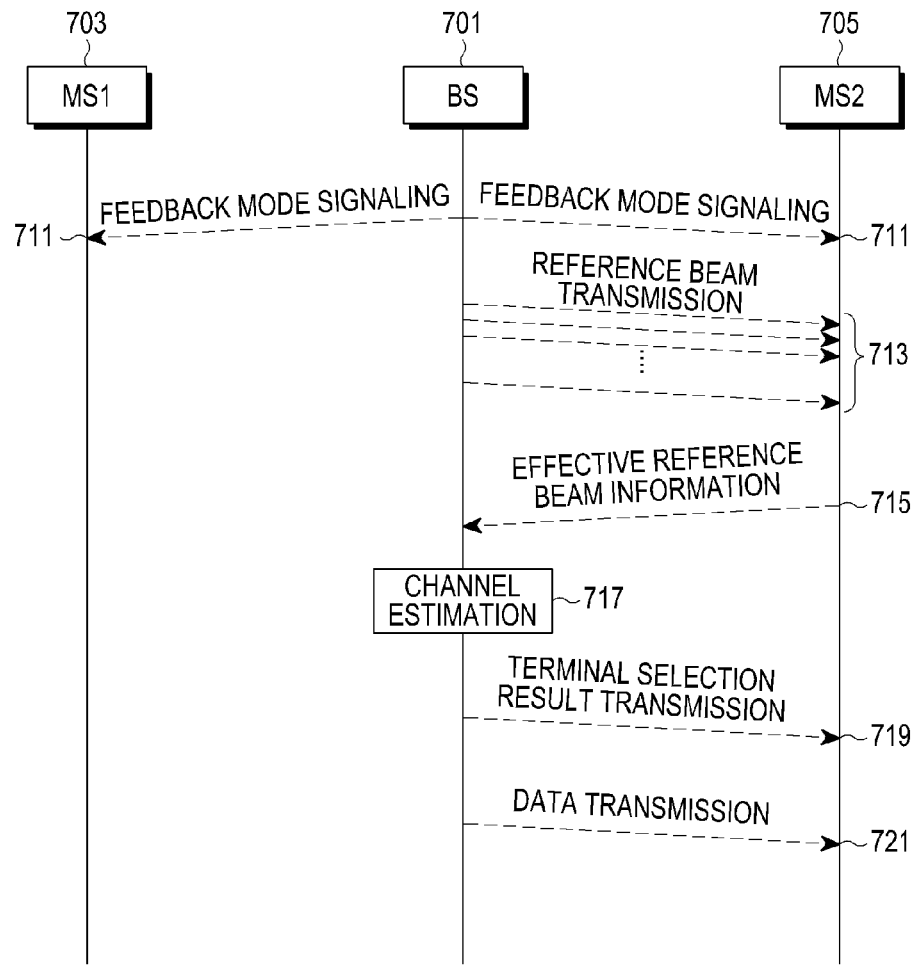
FIG. 7 is a diagram illustrating a process of performing channel estimation by operating a cell-specific reference beam by a base station trigger according to an embodiment of the present disclosure.

FIG. 7 is a diagram illustrating a process of performing channel estimation by operating a cell-specific reference beam by a base station trigger according to an embodiment of the present disclosure.

In FIG. 7, it is assumed that an MS1 703 corresponds to a terminal desiring a relatively low data rate, and operates using a feedback method according to the conventional method, and an MS2 705 corresponds to a terminal desiring a relatively high data rate, and operates using a feedback method according to the channel estimation proposed by the present disclosure.

In step 711, the base station 701 determines a feedback method suitable for each terminal, and performs signaling on the determined feedback method to the MS1 and MS2 703 and 705. That is, the feedback method according to the conventional method is signaled to the MS 1 703, and the feedback method according to the present disclosure is signaled to the MS2 705. Since an operation between the MS1 703 and the base station BS 701 is based on the conventional method, a detailed description therefor will be omitted for the sake of convenience. Meanwhile, the operations of step 713 to step 721 correspond to operations between the MS2 705 and the BS 701, and are the same as step 201 to step 209 of FIG. 2 previously described.

That is, in step 713, the BS 701 transmits reference beams to the MS2 705. In step 715, the MS2 705 measures reception signal strengths of the received reference beams, selects, as effective beams, reference beams for which the reception signal strengths are equal to or greater than a predetermined reference value, and generates information on the selected effective beams so as to feedback the same to the BS 701.

Here, information on the effective beam includes the signal strength value on the effective beam and beam index information. In addition, the signal value may be transmitted as a quantized value. Meanwhile, as a method for performing feedback of the beam index value, an explicit method and an implicit method are possible. The explicit method is a method for performing direct feedback of the beam index value, and the implicit method is a method for performing feedback in the form of beam index information associated with at least one of frequency and time resources or the ID of a terminal.

In step 717, the base station 701 estimates a channel of the MS 2 705, using information on the received effective beam. For reference, the base station 701 may perform scheduling for the MS2 705 using the channel estimation, and may design a pre-coder of a baseband and high-frequency band.

In step 719, the base station 701 may select the MS2 705 based on the channel estimation, and notify of a result of the selection to the MS2 705, and transmit data to the MS2 705 in step 721.

Figure 8A:
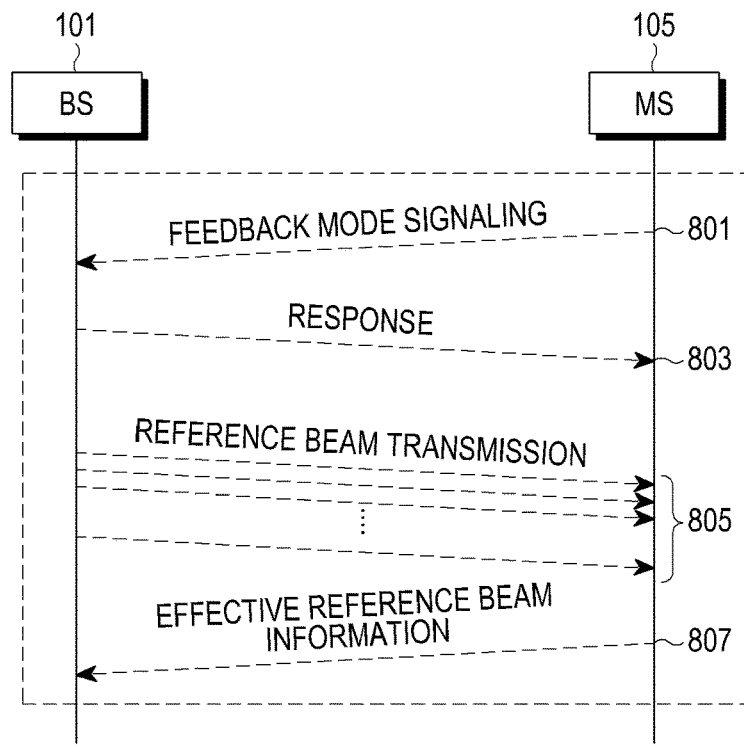
FIG. 8A and FIG. 8B are drawings illustrating a process of performing channel estimation by operating a cell-specific reference beam by a terminal trigger according to an embodiment of the present disclosure.
Figure 8B:
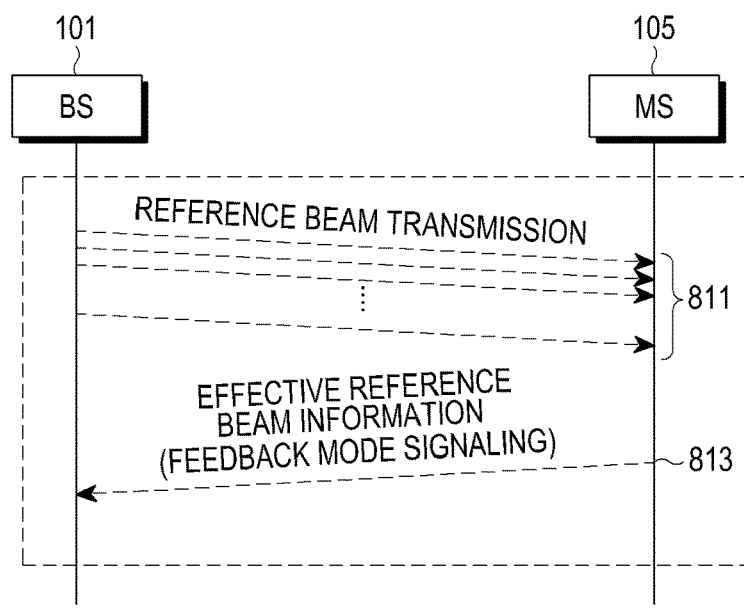

FIG. 8A and FIG. 8B are diagrams illustrating a process of performing channel estimation by operating a cell-specific reference beam by a terminal trigger according to an embodiment of the present disclosure.

In FIG. 8A and FIG. 8B, two embodiments are performed. FIG. 8A is a method of explicitly signaling, by a terminal, a feedback method determined by the terminal itself to the base station, and FIG. 8B is a method of implicitly signaling, by the terminal, a feedback method determined by the terminal itself to the base station.

First, FIG. 8A corresponding to explicit signaling will be described. In step 801, the terminal (MS) 105 determines a feedback method and signals the same to the base station (BS) 101. In step 803, the BS 101 transmits a response for the feedback signaling to the MS 105. In step 805, the BS 101 transmits a reference beam, and in step 807, the MS 105 determines an effective beam with respect to the reference beam, and transmits effective beam information determined accordingly thereto to the BS 101.

FIG. 8B will be described, which corresponds to the implicit signaling. In step 811, the BS 101 transmits the reference beams to the MS 105. In step 813, the MS 105 determines a feedback mode, generates a feedback signal according to the determined feedback method, and transmits the same to the BS 101.

If the MS 105 has determined to use the conventional feedback method, the MS 105 selects the best beam among the received analog beams, and feeds back the selected index and the CQI of the corresponding beam. If the MS 105 selects the reference beam-based feedback method according to the present disclosure, the MS 105 selects an effective beam among the reference beams, and transmits the selected effective beam information to the BS 101.

The implicit signaling of FIG. 8B does not include a process of explicitly signaling the feedback method determined as in step 801 of FIG. 8A. Instead, in FIG. 8B, the feedback method is implicitly signaled by the pre-appointment between the BS 101 and the MS 105 according to the type of the feedback signal transmitted in step 813.

Hereinafter, a scheme of compressing a feedback signal and transmitting the same, in order to reduce the overhead of a feedback signal transmitted from a terminal to a base station, will be described with reference to FIG. 9.

The method of compressing a feedback signal proposed in the present disclosure will be referred to as "Compressed sensing-based feedback signal compression", and the compressed sensing-based feedback compression method operates with the following structure.

Figure 9:
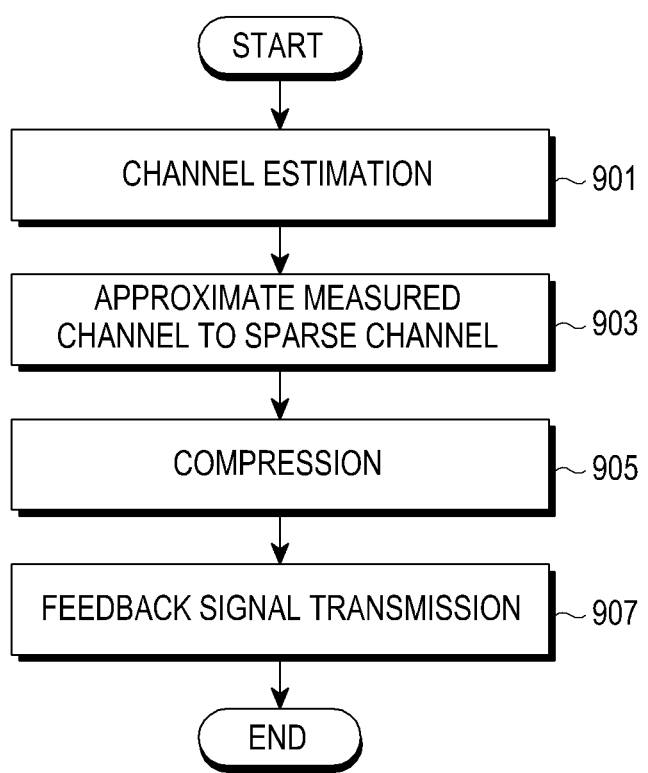
FIG. 9 is a diagram illustrating a feedback signal compression method by a compression sensing method according to an embodiment of the present disclosure.

FIG. 9 is a diagram illustrating a feedback signal compression method according to an embodiment of the present disclosure.

In step 901, the terminal estimates a channel by using the reference beam received from the base station, and approximates the estimated channel to the sparse channel in step 903. In step 905, the terminal compresses the approximated sparse channel to acquire the compressed analog value. Then, in step 907, the terminal feeds back the compressed value.

As an example of the step 905, when the magnitude of a channel vector of the channel estimated in the terminal is 16×1, 16 complex values may be fed back in order to feed back the channel vector. However, according to compression method proposed by the present disclosure, the magnitude of a channel vector of the channel estimated in the terminal is converted into the magnitude of a channel vector of 4×1 or 8×1, which is smaller than 16×1, and then feeds back only four or eight values among the compressed channel vectors, so as to reduce the overhead.

An example of the above-described feedback compression method will be described.

When the channel vector estimated by the terminal is referred to as h, the channel may be converted into a sparse channel having another shape according to a given basis. An example where a channel is converted into a sparse channel is as follows.

If there are eight transmission antennas and one reception antenna, the channel estimated from the terminal is a vector having eight complex values. However, for convenience of description, it is assumed that complex vector values are real numbers in the below. Here, it is assumed that a conversion matrix for approximating the estimated channel h to a sparse channel (hs) is Q. Various conversion matrices may be used, however, it is assumed herein that the conversion matrix is a unitary matrix. Here, arbitrary 8×8 unitary matrix may be represented by <Equation 4> as follows.

$$Q=[q_1, \ldots, q_8] \quad \text{[Equation 4]}$$

Here, qi (i=1~8) represents each column vector in a unitary matrix.

Meanwhile, when a sparse approximation with respect to the estimated channel h is performed by using the conversion matrix Q, a sparse signal s is represented by <Equation 5> as follows.

$$s = Qh = \begin{bmatrix} 0.1 \\ 0.05 \\ 0.7 \\ 0.01 \\ 0.05 \\ 0.5 \\ 0.01 \end{bmatrix} \approx \begin{bmatrix} 0 \\ 0 \\ 0.7 \\ 0 \\ 0 \\ 0 \\ 0.5 \\ 0 \end{bmatrix} \quad \text{[Equation 5]}$$

Since the estimated channel h is obtained by a linear combination of each column of the conversion matrix Q that is a unitary matrix, as shown in <Equation 5>, the estimated channel h may be represented by coefficient vectors for vectors of each conversion matrix Q. Here, in the <Equation 5>, the vector including zero value is a sparse signal s, and a sparse channel h_s that again represents the sparse signal s in the form of a channel is represented by <Equation 6> as follows.

$$h_s = 0.7q_3 + 0.5q_7 \quad \text{[Equation 6]}$$

The <Equation 6> is obtained by substituting coefficients into zero, which have values smaller than a predetermined threshold value or have relatively smaller values, among values of the coefficients consisting of the sparse signal s of the <Equation 5>. As a result, the sparse signal s of the <Equation 5> is approximated to the sparse channel hs of <Equation 6>, which has two non-zero values of 0.5 and 0.7.

Meanwhile, the approximated sparse channel h_s may be compressed to a channel having a vector magnitude smaller than a vector of magnitude of the first 8×1, according to a predetermined compression matrix. In the present disclosure, the compressed matrix will be expressed as "C". The magnitude of the compressed matrix C is a×8, where 'a' is a value less than 8. Therefore, the finally compressed h_c channel is represented by <Equation 7> as follows.

$$h_c = Ch_s = CQs = Ms \quad \text{[Equation 7]}$$

Here, M is a measurement matrix, and M is defined as the product of the compressed matrix C and the conversion matrix Q.

For reference, the value of 'a' is determined by the number of values other than zero (in the above example 2) among the vector magnitude (in the above example, 8×1) of the first estimated channel h and values of elements of the sparse signal vector s. Meanwhile, it is known that the compression of a sparse signal s is stable the less the number of non-zero values exist in the sparse signal s. In addition, as the approximation of the estimated channel h using the sparse signal s becomes better performed, the compression performance is high. As an ideal example of the approximation of a sparse signal, when a vector in the same direction with the estimated channel h is included in the conversion matrix Q, the sparsity of the estimated channel h may be approximated to 1. However, the problem is in that, since a transceiver should know the conversion matrix Q used for the conversion and recovery into a sparse channel in order to recover the compressed channel h_c into the first estimated channel h, the ideal sparse approximation is not possible. In consideration of the above description, when each transceiver has a conversion matrix Q, which includes vectors capable of representing the estimated channel h, the compression performance of the feedback signal can be maximized. Accordingly, in the present disclosure, the terminal configures the conversion matrix Q using the reference beam transmitted by the base station such that the base station and the terminal may have vectors that are representative of the channel h, respectively.

The <Equation 7> will be described again in relation to recovery method of the channel h.

Referring to <Equation 7> again, hc=C·Q·s.

Here, s is a sparse signal, generated by the terminal, from a plurality of reference beams transmitted from the base station, C is a predetermined compression matrix that is previously determined between the base station and the terminal, and Q is a conversion matrix for converting the channel h. In addition, hc is the compressed matrix generated by the terminal, and in the present disclosure, the terminal may reduce the amount of feedback information by feeding back the hc to the base station.

The base station should finally recover the channel h from the fed back hc. It can be seen that the base station receives the hc fed back from the terminal, and C is previously determined between the base station and terminal. On the other hand, since Q is generated by the base station and the terminal in common, from a plurality of reference beams transmitted from the base station in the present disclosure, the base station and the terminal may commonly know the Q. That is, since the base station has known the hc, C, Q, the sparse signal s can be obtained by using <Equation 7>. In addition, the channel h can be recovered, from the sparse signal s and conversion matrix Q, by using the <Equation 5>.

To summarize the description so far made, the terminal generates a conversion matrix Q using the reference beams transmitted by the base station, generates a sparse signal s (or sparse channels hs) from Q, generates a compressed channel hc, from the sparse channel hs, using the compressed matrix C, and feeds back the values of the compressed matrix hc to the base station. The base station generates a sparse signal s from the Q hc that is generated from the hc, the predetermined C, and the reference beams. Then, the terminal may recover the channel h by using the s and Q.

However, in the above-described embodiment, it has been described that the base station and terminal generate Q using the reference beams transmitted by the base station. However, in another embodiment, when the channel information between the base station and the terminal is known, a method of generating the conversion matrix Q is possible by using channel information between the base station and the terminal. In addition, the present disclosure may be utilized in a system based on code book not a reference beam.

If the base station transmits orthogonal reference beams, a matrix formed of the orthogonal reference beams may be used as the conversion matrix Q.

On the other hand, when the base station transmits non-orthogonal reference beams, the base station may determine the conversion matrix Q by dividing two cases as follows.

First, when the base station transmits non-orthogonal reference beams, and the terminal additionally signals an effective beam index to the base station, the conversion matrix Q may be configured through the orthogonalization process using the <Equation 3>. Second, when the base station transmits non-orthogonal reference beams but the terminal does not signal the effective beam index, the base station estimates the conversion matrix Q and a sparse signal s in the method as follows.

The second case, which is the case where the base station transmits the non-orthogonal reference beams and the terminal does not signal the effective beam index, will be described based upon <Equation 5> to <Equation 7>.

At first, a first measurement matrix M is configured by a conversion matrix Q including a predetermined compression matrix C and reference beams (w1, w2, . . . , w8). When a search using Greedy algorithm is performed, an inner product between each of the column vectors configuring a measurement matrix and the compression channel hc is successively performed, whereby a column vector of the measurement matrix, which has the maximum inner product value, is searched. When the inner product between the measurement matrix and the compression channel is performed, the column position of the matrix that has the maximum inner product value corresponds to a position, which is the first non-zero value position in the sparse signal s, and the value of first non-zero value position becomes an inner value of the corresponding column. Then, in order to find a second non-zero value, the compressed channel h_c is updated by using <Equation 8>.

$$h\_c' = h\_c - t1 * w3 \quad \text{[Equation 8]}$$

Here, as an example of the <Equation 5>, upon the assumption that the beam vector w3 has the maximum inner product value, t1 of <Equation 8> is an inner product value between w3 (=q3) and the h_c, here, if it is an ideal environment without noise and interference, t1=0.7. Then, the process described prior to the <Equation 8> is performed again with respect to the updated compressed channel h_c.

Here, the measurement matrix M is configured by a predetermined compression matrix C and the updated conversion matrix Q. In addition, the update of the conversion matrix Q is performed in the form of orthogonalization of the current conversion matrix Q based on the beam vector of w3 (=q3), which has the maximum inner product value of the first reference beam set. This process is the same as the <Equation 5>.

In the following process, the update of the compression channel (h_c) is repeatedly performed using the selected conversion matrix (Q), and the measurement matrix M is also updated by the updated Q. The above-mentioned process is repeated based upon the updated measurement matrix M so that the base station may estimate a non-zero value of the sparse signal. If there is no noise and interference environment, the base station may operate in the same manner as the complete Q.

Figure 10A:
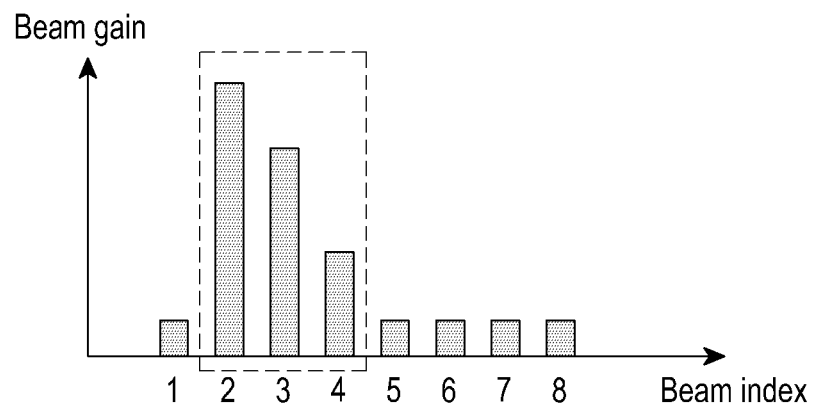
FIG. 10A and FIG. 10B are drawings illustrating gains of reference beams, received by a UE1 and a UE2, when a transmitter transmits eight reference beams according to an embodiment of the present disclosure.
Figure 10B:
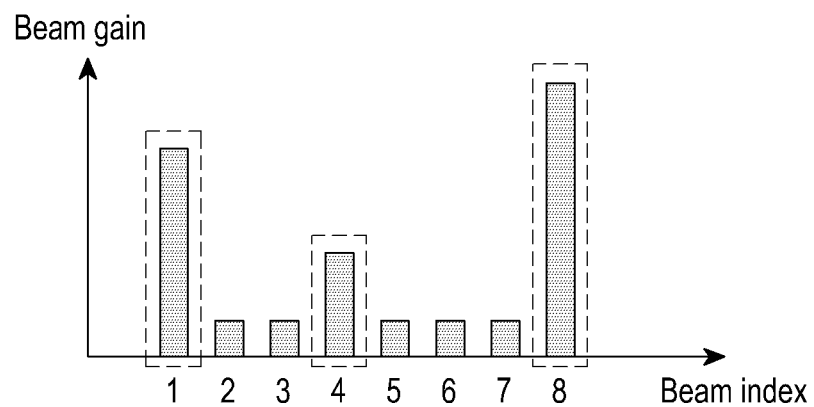

FIG. 10A and FIG. 10B are diagrams illustrating gains of reference beams, received by a UE1 and a UE2, when a transmitter transmits eight reference beams according to an embodiment of the present disclosure. FIG. 10A is a diagram illustrating gains of reference beams measured by the UE 1, and FIG. 10B illustrates gains of reference beams measured by the UE 2.

It is assumed that terminals select a predetermine number of reference beams having the largest gain among the received reference beams, in FIG. 10A and FIG. 10B, each terminal selects three reference beams, as effective beams, from eight reference beam.

Referring to FIG. 10A, the UE1 selects beams 2, 3, 4 which have the first to third maximum gains among the received reference beams, and referring to FIG. 10B, the UE2 selects beams 1, 4, 8, which have the first to third maximum gains among the received reference beams.

Each terminal may configure the conversion matrix Q including the selected beams, and may configure a sparse signal s using a complex value for each of the beams. In other words, the complex values of the selected effective beams are non-zero value in the sparse signal s. However, the corresponding complex values for the non-orthogonal beams are calculated again using <Equation 3>.

According to the present disclosure, the complexity of a sparse approximation process for obtaining the sparse signal s or a calculation amount thereof are reduced. In addition, when approximation of the sparse signal is performed, a sparsity level can be minimized so as to improve compression efficiency and improve the recovery performance of the estimation channel through the fed back compressed channel.

Figure 11:
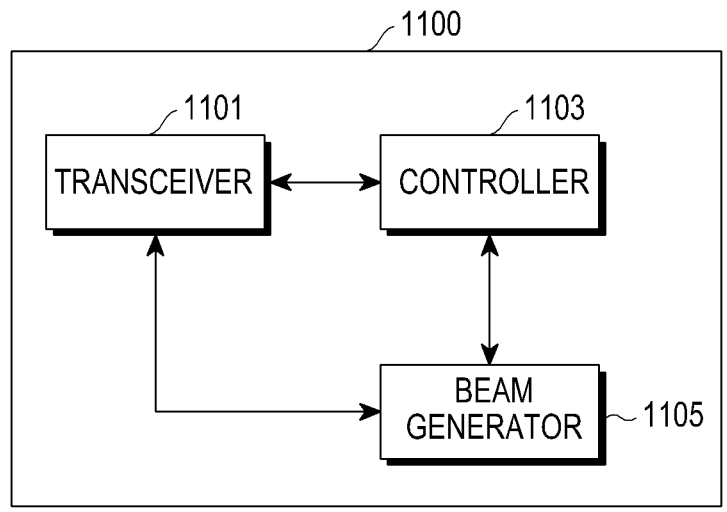
FIG. 11 is a diagram illustrating the configuration of a base station apparatus that operates according to an embodiment of the present disclosure.

FIG. 11 is a diagram illustrating the configuration of a base station apparatus that operates according to an embodiment of the present disclosure.

The base station apparatus 1100 includes a transceiver 1101, a controller 1103, and a beam generator 1105.

The beam generator 1105 generates a reference beam set including a plurality of reference beams, and transmits the same to the terminal through the transceiver 1101. The reference beam may be a cell-specific reference beam or a terminal-specific reference beam.

The controller 1103 performs overall operations according to embodiments of the present disclosure.

Typically, the controller 1103 receives effective beam information or channel information from a terminal through the transceiver 1101. If the effective beam information is received, the controller performs channel estimation using the same, and performs scheduling, etc. using the same. If the channel information is received, the controller may directly perform the scheduling using the channel information. However, when the received channel information corresponds to compressed channel information, the controller recovers the channel information estimated by the terminal, using the conversion matrix and the compression matrix as described above.

In addition, if the channel estimation is configured to be performed by the base station, as described in FIG. 2, the controller 1103 may receive the effective beam information from the terminal, and estimate a channel by using the same. However, the channel estimation may be performed in a separate element channel estimator (not shown).

As well as the above operations, operations associated with the base station described above are performed in the controller 1103, and the detailed contents are described earlier in the above.

Figure 12:
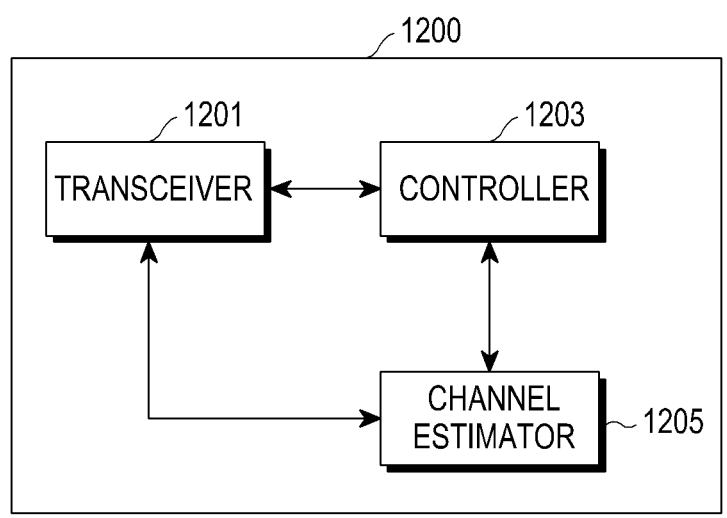
FIG. 12 is a diagram illustrating the configuration of a terminal apparatus that operates according to an embodiment of the present disclosure.

FIG. 12 is a diagram illustrating the configuration of a terminal apparatus that operates according to an embodiment of the present disclosure.

The terminal apparatus 1200 includes a transceiver 1201, a controller 1203, and a channel estimator 1205.

The controller 1203 receives a set of reference beams including a plurality of the reference beams transmitted by the base station through the transceiver 1201, and selects the effective beam therefrom.

When the terminal performs channel estimation, the channel estimator 1205 estimates a channel based on the effective beam information. The channel, estimated on the basis of the effective beam information, may be called the "sparse channel" as previously described. The channel estimator 1205 generates channel information based on the estimated channel and transmits the same to the base station through the transceiver 1201. Meanwhile, the channel information generated by the channel estimator 1205 may be generated according to "compressed sensing-based feedback signal compression" method described earlier in the examples of the <Equation 4> to <Equation 7>.

On the other hand, in a case where the base station performs channel estimation, the controller 1203 transmits, to the base station, effective beam information on the selected effective beam through the transceiver 1201, and the base station estimates a channel between the base station and the terminal using the effective beam information.

In addition, the terminal apparatus 1200 performs overall operations related to the terminal that was described prior to FIG. 10A and FIG. 10B as well as main operations of the present disclosure as described above. However, a duplicated detailed description thereof will be omitted. The particular aspects of the present disclosure as described above may be implemented as a computer-readable code in a computer-readable recording medium. The computer-readable recording medium is a predetermined data storage device that can store data which can be read by a computer system. The computer-readable recording medium may include a Read-Only Memory (ROM), a Random-Access Memory (RAM), CD-ROMs, magnetic tapes, floppy disks, optimal data storage devices, and carrier waves (such as data transmission through the Internet). The computer-readable recording medium may be distributed through computer systems connected to the network, and accordingly the computer-readable code is stored and executed in a distributed manner. Further, functional programs, codes, and code segments to achieve the present disclosure may be easily interpreted by programmers skilled in the art.

It will be understood that a method and apparatus according to an embodiment of the present disclosure may be implemented in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can also be appreciated that the software may be stored in a machine (for example, a computer)-readable storage medium. It will also be understood that a method and apparatus according to an embodiment of the present disclosure may be implemented by a computer or portable terminal including a controller and a memory, and the memory is an example of a machine readable device adapted to store a program or programs including instructions for implementing embodiments of the present disclosure.

Accordingly, the present disclosure includes a program including a code for implementing the apparatus or method described in any of the appended claims of the specification and a machine (computer or the like) readable storage medium for storing the program. Further, the program may be electronically carried by any medium such as a communication signal transferred through a wired or wireless connection, and the present disclosure appropriately includes equivalents thereof.

Further, an apparatus according to an embodiment of the present disclosure may receive the program from a program providing device that is wiredly or wirelessly connected thereto, and may store the program. The program providing device may include a program including instructions through which a program processing device performs a preset content protecting method, a memory for storing information and the like required for the content protecting method, a communication unit for performing wired or wireless communication with the program processing device, and a controller for transmitting the corresponding program to a transceiver at the request of the program processing device or automatically.

Then invention claimed is:

1. A method for estimating a channel by a terminal in a wireless communication system supporting beamforming using a plurality of antenna elements, the method comprising:
   receiving, from a base station, a set of reference beams including a plurality of reference beams;
   determining whether the set of reference beams is configured with orthogonal beams or non-orthogonal beams, wherein each of the set of reference beams is orthogonally configured to each other when the set of reference beams is configured with the orthogonal beams, and each of the set of reference beams is not orthogonally configured to each other when the set of reference beams is configured with non-orthogonal beams;
   selecting at least one effective beam from the set of reference beams based on a result of the determination;
   estimating a channel between the base station and the terminal on a basis of the selected at least one effective beam;
   generating channel information based on the estimated channel; and
   transmitting the generated channel information to the base station.

2. The method of claim 1, wherein, if the set of reference beams is configured with orthogonal beams, selecting the at least one effective beam comprises selecting reference beams for which reception signal values are equal to or greater than a predetermined reference value, among the reference beams, as the effective beam.

3. The method of claim 1, wherein, if the set of reference beams is configured with non-orthogonal beams, selecting the at least one effective beam comprises:
   selecting a first reference beam for which reception signal value is a greatest, among the reference beams, as the effective beam;
   performing orthogonalization of remaining reference beams based on the first reference beam;
   selecting a second reference beam for which the reception signal value is a greatest, among signal values of the orthogonalized remaining reference beams, as the effective beam; and
   selecting a predetermined number of effective beams by repeating a technique that is used for selecting the second reference beam as the effective beam with respect to the reference beams except for the first reference beam and the second reference beam.

4. The method of claim 1, wherein the set of reference beams is a cell-specific reference beam set that is commonly transmitted to terminals within a coverage of the base station.

5. The method of claim 4, wherein the cell-specific reference beam set is repeatedly transmitted in a plurality of time intervals on a same frequency resource, or repeatedly transmitted in a plurality of frequency resources on a same time interval, and wherein all of the cell-specific reference beam sets repeatedly transmitted in at least one of the plurality of time intervals or in the plurality of frequency resources are identical.

6. The method of claim 4, wherein the cell-specific reference beam set is repeatedly transmitted in a plurality of time intervals on a same frequency resource or repeatedly transmitted in a plurality of frequency resources on a same time interval, and wherein at least two cell-specific reference beam sets repeatedly transmitted in at least one of the plurality of time intervals or in the plurality of frequency resources are different from each other.

7. The method of claim 1, wherein the set of reference beams comprises a terminal-specific reference beam set including the plurality of reference beams generated for the terminal, on a basis of the channel information between the base station and the terminal that is already known by the base station.

8. The method of claim 1, further comprising receiving, from the base station, a terminal-specific reference beam set including the plurality of reference beams generated, for the terminal, by the base station, on a basis of the channel information transmitted to the base station.

9. The method of claim 8, further comprising:
   selecting at least one effective beam from the plurality of reference beams included in the terminal-specific reference beam set;
   estimating the channel between the base station and the terminal based on the selected at least one effective beam from the terminal-specific reference beam set; and
   transmitting, to the base station, the channel information on the channel estimated based on the selected at least one effective beam from the terminal-specific reference beam set.

10. The method of claim 8, wherein receiving the terminal-specific reference beam set from the base station comprises at least one of:

receiving, in response to a request for transmitting the terminal-specific reference beam set by the terminal, the terminal-specific reference beam set from the base station; or
    receiving the terminal-specific reference beam set from the base station without the request of the terminal.

11. The method of claim 8, wherein the terminal-specific reference beam set generated by the base station is generated in a space orthogonal to a channel space according to at least one of the channel information or a space adjacent thereto.

12. The method of claim 1, further comprising, prior to receiving of the set of reference beams, receiving, from the base station, a message instructing to operate in a feedback mode using the set of reference beams.

13. The method of claim 1, further comprising prior to receiving of the set of reference beams:
    transmitting signaling information notifying that the terminal operates in a feedback mode using the set of reference beams; and
    receiving a response corresponding to the signaling information transmitted to the base station.

14. The method of claim 1, wherein generating the channel information comprises generating compressed channel information obtained by multiplying a channel matrix of the estimated channel, a conversion matrix generated using the set of reference beams, and a predetermined compressed matrix.

15. A method for receiving channel information by a base station in a wireless communication system supporting beamforming using a plurality of antenna elements, the method comprising:
    transmitting a set of reference beams including a plurality of reference beams to a terminal; and
    receiving, from the terminal, channel information on a channel between the base station and the terminal that is estimated by the terminal, on a basis of at least one effective beam selected from the plurality of reference beams included in the set of reference beams,
    wherein the at least one effective beam is selected based on whether the set of reference beams is configured with orthogonal beams or non-orthogonal beams, and
    wherein each of the set of reference beams is orthogonally configured to each other when the set of reference beams is configured with the orthogonal beams, and each of the set of reference beams is not orthogonally configured to each other when the set of reference beams is configured with non-orthogonal beams.

* * * * *